Patented July 7, 1953

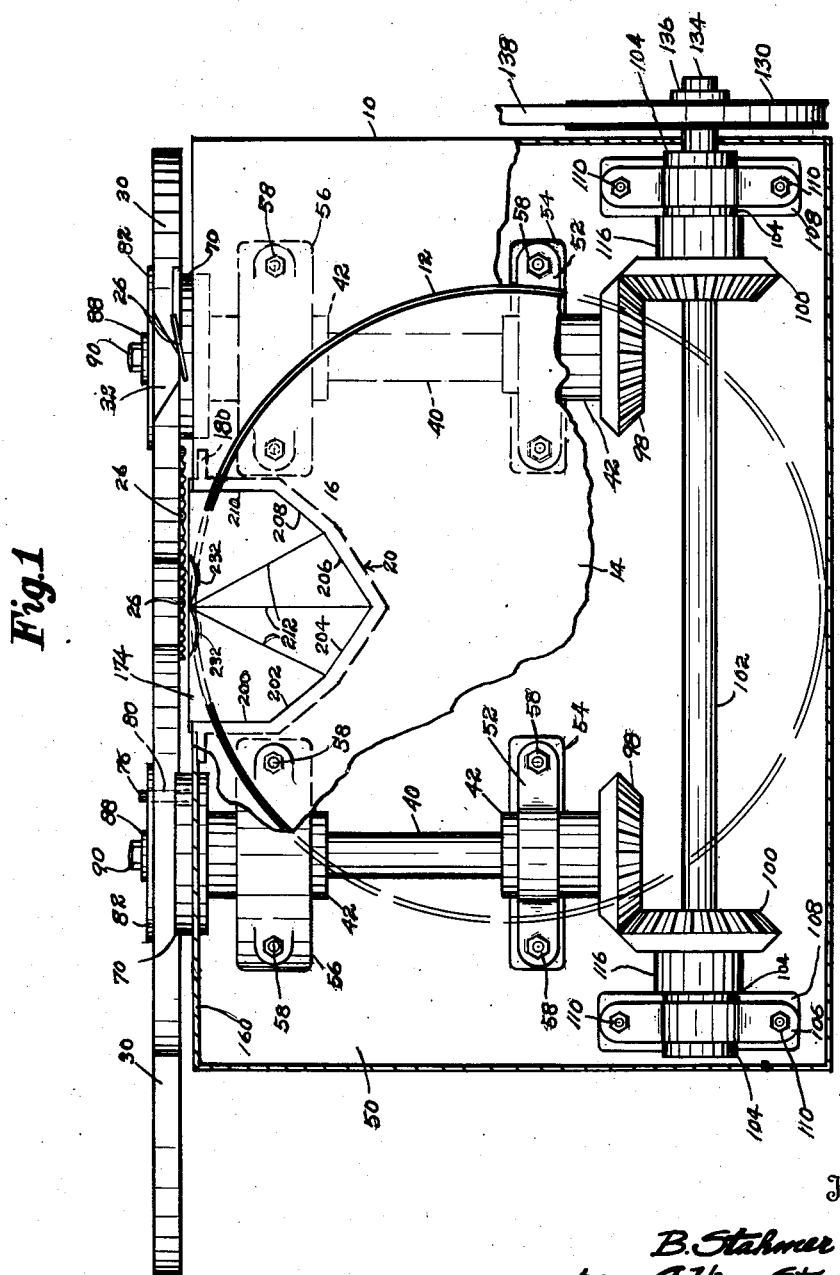

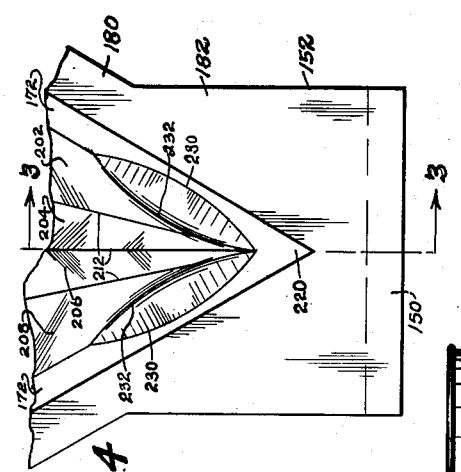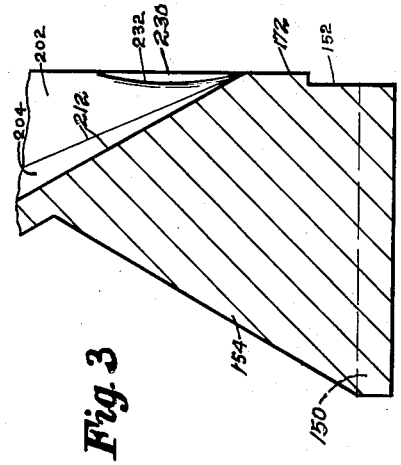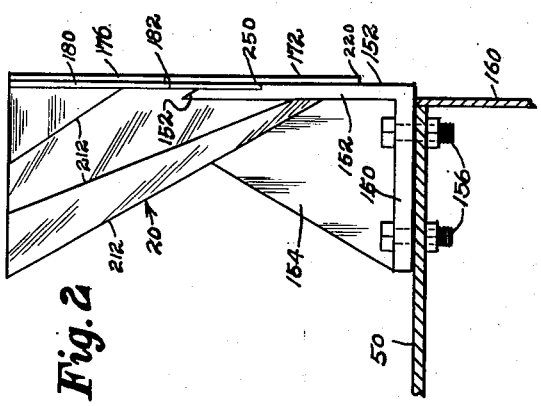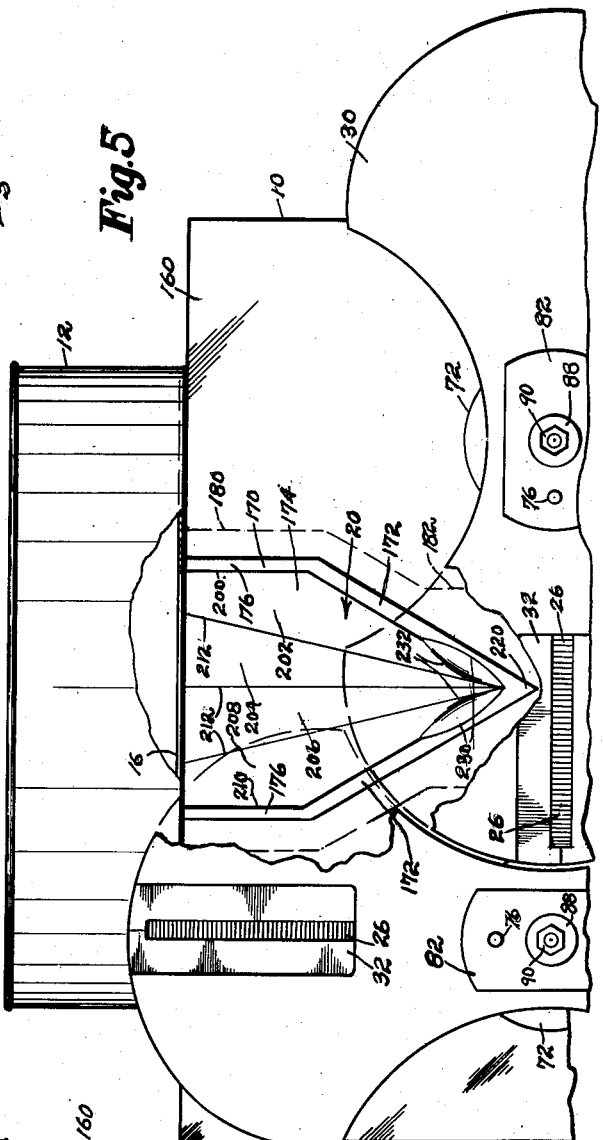

2,644,500

UNITED STATES PATENT OFFICE 2,644,500

FEED CHUTE FOR POTATO CHIP MACHINES

Bernhardt Stahmer, Omaha, Nebr.

Application March 22, 1950, Serial No. 151,230

4 Claims. (Cl. 146—78)

This invention relates to potato chip slicing machines and more particularly it is an object of this invention to provide an improved feed chute for delivering potatoes to such a machine for slicing.

A particular object of the invention is to provide an improvement in the means for delivering potatoes to the cutter in the slicing machine described in the applicant's prior patent application titled "Eccentric Potato Slicer," Serial Number 35,611, filed June 28, 1948, now Pat. #2,567,248.

In a slicing machine having a round feed chute, such as described in the patent issued December 17, 1935, to G. F. Goodman, Jr., titled "Machine for Making Potato Chips," No. 2,024,353, the potato is free to twist or rotate in the chute during cutting. This is the cause of considerable waste.

As an improvement upon the chute described in the Goodman patent, the applicant has experimented with chutes having bottom walls inclinedly disposed with respect to the vertical for feeding potatoes to cutters revolving in a vertical plane. A wall disposed back of the feed opening and of a V shape was tried.

The V shaped wall permitted potatoes to fall downwardly with sufficient speed and tended to prevent rotation of the potatoes. It had a great disadvantage, however, in that smaller potatoes tended to fall out past the cutters since the feed opening of my machine is not disposed so as to be covered at all times by the cutter as is the case with the Goodman machine. It was very difficult to see how this problem could be solved.

Experiments were next made with feed chutes having smaller opening sizes but larger chute volume for receiving large potatoes, yet preventing small potatoes from falling out. The first such attempts were made with a chute having a back wall of semi-circular horizontal cross section. Upwardly and downwardly extending ridges were placed on the wall so as to prevent rotation of the potato chips.

The shape of the chute must necessarily be tapering to smaller size at its lower end because the potato becomes smaller as it is sliced and slides downwardly as it becomes smaller. Because of this shape the ridges converge toward each other at their lower ends causing the potato to wedge therebetween, preventing their falling downwardly.

Other attempts were made with a chute of the same shape but with grooves extending upwardly and downwardly in the wall thereof. But the potatoes wedged into the grooves under the pressure of the knife, holding into the grooves in such a manner that the potato would not fall down.

Still other attempts including the gluing of sandpaper upon the chute surface and also the roughening of the surface in other manners. These were unsuccessful because it is necessary that the potato move downwardly with its freshly cut surface always in parallelism with the cutters. The rough surfaces tended to trip the lower backward side of the potato, causing the top of the potato to fall forwardly toward the cutters. In this manner, the potatoes tipped over and poor chips were formed.

After much thought, experiment, and great expense the problem was solved. This was accomplished only after many machines had been sold.

The chute of this invention was then conceived. It will accommodate potatoes as large as the V chute did and yet will retain small potatoes, preventing them from falling uncut past the blades.

It is, therefore, an object of this invention to provide a potato feed chute having a multi-angle back wall whereby a maximum sized potato can be accommodated in a chute having a minimum of opening size, with a minimum of potato rotation and good potato falling speed.

Still another object of the invention is to provide a potato feed chute as specifically described and shown.

Yet another object is to provide a feed chute having at least four surfaces disposed consecutively, side-by-side, each at an angle with respect to the others.

Yet another object of the invention is to provide a device for the purpose described which is sturdy and durable in construction, reliable and efficient in operation, and relatively simple and inexpensive to manufacture, assemble and utilize.

Yet a further object of this invention is to provide a feed chute having a larger upper cavity disposed in communication with the outlet opening for holding large potato portions during cutting and a smaller cavity disposed beneath the larger cavity for receiving potato remnants as the latter fall downwardly from the larger into the smaller cavity, the back wall of the smaller cavity being disposed at a substantially lesser inclination with respect to the vertical than the back wall of the larger cavity.

Another object of the invention is to provide a feed chute having a smaller cavity as described which latter is of a larger size at its upper end than at its lower end.

Another object is to provide a feed chute having a smaller cavity as described, the upper edge of the wall of which is convexially rounded.

A further object is to provide a feed chute having a smaller cavity as described, the back wall of which is formed of two portions disposed one of each side of the outlet opening.

Other and still further objects and advantages of the invention will become apparent from the following detailed description of a preferred embodiment thereof.

In the drawings:

Figure 1 is a top plan view of potato chip machine shown with portions of the top cover thereof broken away, a portion of a hopper bottom and wall being broken away, the outline of the remainder of the wall being indicated in dotted lines. Another portion of the wall and of the hopper which is disposed above a chute of the invention being broken away and indicated only in dotted lines, for clarity of illustration of the chute.

A portion of a drive belt is shown, it being understood that the latter is connected to driving means not shown.

Figure 2 is a side elevation of the hopper shown in Figure 1 showing the manner in which it is secured to frame members of the machine, the latter being partially shown in cross section.

Figure 3 is an enlarged detail of the lower end of the hopper taken along the line 3—3 of Figure 4.

Figure 4 is a frontal elevation of the lower portion of the hopper.

Figure 5 is a frontal elevation of the upper portion of the machine, a portion of the hopper being broken away to show the aperture in the bottom of the hopper through which potatoes pass to the upper end of the chute. Certain portions of the knife carrying members which overlap the chute are broken away and are shown in dotted lines for further showing the chute.

The potato chip machine of this invention is best seen in top plan view in Figure 1 and includes an outer covering or frame 10 on the top of which a circular hopper having a vertically disposed side wall 12 is provided.

The hopper 12 has a bottom 14 disposed in a horizontal plane, the bottom 14 having an opening therethrough as seen at 16 in Figure 5. The opening borders the upper rearward edges of a feed chute generally indicated at 20.

The chute 20, later more fully described, is adapted to convey potatoes downwardly from the hopper to a position adjacent the corrugated cutting knives 26 of the machine. The cutting knives 26 are disposed extending outwardly from slots 32 in the ends of two knife carrying members 30. One of the slots can be clearly seen at 32 in Figure 1.

The blades 26 are disposed on the rearward side of the members 30 whereby chips skived from a potato in the chute 20 are adapted to pass between the knives 26, and the member 30, through the slots 32, and dropped to receiving means not shown. The members 30 are carried by axles 40 which latter are mounted in bearings 42 which latter are secured to a floor 50 of the slicer by straps 52, blocks 54 and 56 and bolts 58.

Each knife carrying member 30 is provided with a recess 40 to the rearward side thereof for receiving a forward portion of a positioning member 72. The latter are secured to the shafts 40 and are provided with pins 76 extending therethrough for reception in bores 80 through the members 30. The pins 76 also extend through washers 82 disposed on the forward sides of members 30. Each member 30 is further provided with a smaller washer 88 between washers 82 and nuts 90 which latter secure the members to the shafts 40.

The shafts 40 are each provided with a pinion 98 in mesh with other pinions 100 on a third shaft 102. The shaft 102 is disposed transversely of the shafts 40 and is mounted in bearings 104 secured in place by straps 106 on blocks 108 by bolts 110. Spacing collars 116 are provided for spacing the pinions 100 apart from the blocks 108.

On one end the shaft 102 is provided with a pulley 130 held in place by a bolt 134 and washers 136. The pulley 130 is provided with a belt 138 which latter is secured to any suitable driving means, not shown.

As best seen in Figure 2, the chute 20 is preferably made as a casing formed integral with mounting portions 150 and 152. The latter are disposed at a right angle to each other and uphold the chute with the assistance of a third portion, the reinforcing web 154. The latter is disposed in a plane at right angles to the planes of the portions 150 and 152 and engages the lower end of the chute 20 rearwardly of the points engaged between portions 152.

The portion 150 is secured by means of bolts 156 to the floor 50 of the machine and the forward wall 160 is shown in Figure 2 extending downwardly from and disposed around the chute casting.

The chute casting is provided with a forwardmost edge surface 170 which has lower straight portions 172 which are disposed on opposite sides of the hopper delivery opening 174, the portions 172 being disposed in an upstanding V, converging downwardly toward each other and joined at their lower ends. The said forwardmost edge 170 is further provided with two other portions 176 which latter extend in parallelism with each other upwardly from the upper ends of the portions 172. The forward side of the chute is further provided with an outwardly extending flange 180 which latter is disposed in parallelism with the opening 174, which latter is preferably disposed in a substantially vertical plane. The flange 180 is disposed slightly rearwardly of the forwardmost edge 170 and is of a uniform width in its upper portion flaring outwardly to a greater width at its lower end.

The feed chute 20 is provided with a back wall disposed opposite the delivery opening 174. The said wall is provided with at least four, preferably approximately flat, surfaces 200, 202, 204, 206, 208, and 210 as best seen in Figure 1. The said surfaces are disposed side-by-side consecutively as seen in horizontal section or in top plan view. The surfaces 200 to 208 have adjoining edges 212 disposed extending upwardly and downwardly at an inclination with respect to the vertical.

The joining edges 210 of the innermost wall surfaces 202, 204, 206, and 208 are disposed converging toward each other and toward the delivery opening 174 at their lower ends.

It will be seen that when the surfaces 204 and 206 are in engagement with a potato they will tend to prevent the latter from rotating. This is possible because the surfaces 202 and 204, and surfaces 206 and 208 also are not joined in a continuous arc.

This construction causes an edge to be in contact with the wall at two points on the potato. If the wall were round the potato would tend to skid on one of its irregular protrusions rotating much more easily.

Another way of defining the preferable chute shape is to say that the adjoining edge portions of the two innermost ones 204 and 206, and preferably also of the other innermost surfaces 202 and 208, are spaced apart from the delivery opening 174 a substantially greater distance than immediately adjacent portions of said surfaces so that potatoes in the chute 20 will tend not to engage said adjoining edges. It will be seen that if the potato were able to engage the adjoining edges, the construction would be one having ridges. If such ridges converged toward each other at their lower ends they would impede the fall of potatoes. The chute is provided with two opening-area-reducing surfaces 200 and 210 which are preferably disposed in approximate parallelism with each other, preferably extending rearwardly at a right angle with respect to the chute opening 174. The surfaces 200 and 210 are disposed near to a right angle with respect to the plane of the opening 174 than are the surfaces 202, 204, 206, and 208. The surfaces 200 and 210 are, as best seen in Figures 2 and 5, disposed only at the upper end of the chute.

The purpose of the surfaces 200 and 210 is to reduce the opening area to a greater extent than would be if the surfaces 202 and 208 continued their same directions until they join the plane to the opening 174. The provision of the surfaces 200 and 210 reduces the opening area for the purpose of preventing smaller potatoes from falling out of the opening at times when the opening is not covered by the knife carriers 30.

As explained previously, the multi-angle back wall of the chute 20 is for the purpose of receiving a potato of maximum size, preventing excessive rotation of the potato, and yet providing a feed opening of a size small enough to prevent the unwanted escape of smaller potatoes.

As best seen in Figures 4 and 5, the chute is provided with an approximately V-shaped lower section as seen in frontal elevation, bounded on two opposite sides by the two inclinedly disposed wall portions 202 and 208, which have a downwardly disposed apex 220. The wall portions 202 and 208 each have elongated terminal edges 172 on their forward side. The terminal edges 172 are each provided with an elongated shallow recess 230 adjacent the apex 220 and extend along the edges 172.

The recesses 230 are each cut from and into that elongated corner of the respective one of the edges 172 which corner is disposed adjacent the opening 174.

The recesses 230 are each concavally curved in a direction in alignment with its respective elongated corner. Each recess 230 is approximately flat in a direction transverse to its respective elongated corner preferably, with the exception that the innermost edges 232 of the recesses 230 are beveled convexially and are in other words rounded off. The purpose of the recesses 230 are to receive the thin last remnant of a potato and to form a backing therefor at times when the remnant is being cut whereby the remnant is supported with its face parallel to the path of the knives. The convexially curved or rounded off edge 232 is so constructed for the purpose of guiding the remnant into the recesses 230 as it falls by gravity downwardly in the chute.

At the lower end of the chute on each side of the apex 220 it will be noticed that the outwardly flared flange portion 182 and the upright structural portion 152 join each other as indicated by a line 250 in Figure 2.

This invention has provided a feed chute for a potato slicing machine which is particularly adapted to achieve an optimum balance between the desired factors involved, which latter include: the reception of large size potatoes, the elimination of the loss by falling out of smaller potatoes, the prevention of rotation or twisting, rapid potato falling speed, and the utilization of potato remnants.

It will be further seen that the feed chute can be thought of as having two cavities one disposed above the other, the upper cavity being formed between walls 202 to 210, the lower cavity being provided with a wall having two portions as indicated by the two walls of the recess 230.

The wall portions of the smaller cavity are disposed at a lesser inclination with respect to the vertical and with respect to the hopper opening 174 than are the walls 202 to 208 inclusive, of the larger upper cavity. The upper cavity is for holding large potatoes and large potato remnants, the smaller cavity is for holding small potato remnants.

From the foregoing description, it is thought to be obvious that a feed chute for potato chip machines constructed in accordance with my invention is particularly well adapted for use, by reason of the convenience and facility with which it may be assembled and operated, and it will also be obvious that my invention is susceptible of some change and modification without departing from the principles and spirit thereof, and for this reason I do not wish to be understood as limiting myself to the precise arrangement and formation of the several parts herein shown in carrying out my invention in practice, except as claimed.

I claim:

1. In a potato slicing machine: a chute for holding potatoes while the latter are being cut, said chute having an opening disposed in an approximately vertical plane, said opening having an approximately V-shaped lower section as seen in frontal elevation, said lower section being bounded on two opposite sides by two inclinedly disposed wall portions having a downwardly disposed apex, said wall portions each having an elongated forward terminal edge disposed in said plane, said edges each having an elongated shallow recess therein adjacent said apex and extending along said edge, said recesses each being in that elongated corner of the respective one of said edges which corner is disposed adjacent of said delivery opening, said recesses each being concavally curved in a direction in alignment with its respective elongated corner, and said recesses each being approximately flat in a direction transverse to its respective elongated corner with the exception that the innermost edges of said recesses are bevelled convexedly.

2. In a potato slicing machine: a chute for holding potatoes while the latter are being cut, said chute having an opening disposed in an approximately vertical plane, said opening having an approximately V-shaped lower section as seen in frontal elevation, said lower section being bounded on two opposite sides by two inclinedly disposed wall portions having a downwardly disposed apex, said wall portions each having an elongated forward terminal edge disposed in said plane, said edges each having an elongated shallow recess therein adjacent said apex and extending along said edge, said recesses each being in that elongated corner of the respective one of said edges which corner is disposed adjacent said delivery opening, said recesses each being concavally curved in a direction in alignment with its respective elongated corner, and said recesses each being approximately flat in a direction transverse to its respective elongated corner.

3. In a potato slicing machine: a chute for holding potatoes while the latter are being cut, said chute having an opening disposed in an approximately vertical plane, said opening having an approximately V-shaped lower section as seen in frontal elevation, said lower section being bounded on two opposite sides by two inclinedly disposed wall portions having a downwardly disposed apex, said wall portions each having an elongated forward terminal edge disposed in said plane, said edges each having an elongated shallow recess therein adjacent said apex and extending along said edge, said recesses each being in that elongated corner of the respective one of said edges which corner is disposed adjacent said delivery opening, and said recesses each being concavally curved in a direction in alignment with its respective elongated corner.

4. In a machine for slicing rollable objects, a chute for holding said rollable objects while the same are being sliced, said chute having an opening for receiving said objects and a delivery opening for delivering said objects for slicing, said chute having a first cavity disposed in communication with said openings, said first cavity converging from a larger upper end to a smaller lower end and having a rear wall which is disposed opposite the plane of the delivery opening and being inclinedly disposed with respect to the veritcal, said first cavity having opposite side walls converging towards each other at the lower end, said chute having a set of second cavities of smaller size than the first cavity and formed respectively in said side walls in communication with and adjacent to the lower end of said first cavity, said second set of cavities each having a rear wall opposite the plane of the delivery opening and disposed at a lesser inclination with respect to the vertical than the rear wall of the first cavity, said rear walls of said set of second cavities being spaced at a lesser distance from the plane of said delivery opening than the rear wall of said first cavity is spaced from the plane of said delivery opening, said rear wall of the first cavity having at least four surfaces disposed side-by-side consecutively as seen in horizontal section, said surfaces being approximately flat and each being angularly disposed with respect to each other and to the plane of the delivery opening as seen in horizontal section, said surfaces having adjoining edges disposed extending upwardly and downwardly at an inclination with respect to the vertical, and the lower ends of said adjoining edges being disposed converging towards each other and towards said delivery opening.

BERNHARDT STAHMER.

References Cited in the file of this patent

UNITED STATES PATENTS

| Number | Name | Date |
|---|---|---|
| 635,450 | Thompson | Oct. 24, 1899 |
| 1,395,369 | Stoddard et al. | Nov. 1, 1921 |
| 1,806,105 | Koepf | May 19, 1931 |
| 1,811,743 | Bromberg | June 23, 1931 |
| 2,406,107 | Quinn | Aug. 20, 1946 |

FOREIGN PATENTS

| Number | Country | Date |
|---|---|---|
| 425,375 | Germany | Feb. 18, 1926 |
| 503,436 | Germany | July 31, 1930 |
| 285,889 | Italy | May 25, 1931 |